United States Patent
Maeda et al.

(10) Patent No.: US 8,975,364 B2
(45) Date of Patent: Mar. 10, 2015

(54) POLYAMIDE RESIN

(75) Inventors: Shuichi Maeda, Ube (JP); Tomoyuki Nakagawa, Ube (JP)

(73) Assignee: Ube Industries, Ltd., Ube-Shi, Yamaguchi (JP)

(*) Notice: Subject to any disclaimer, the term of this patent is extended or adjusted under 35 U.S.C. 154(b) by 185 days.

(21) Appl. No.: 13/695,205

(22) PCT Filed: Apr. 27, 2011

(86) PCT No.: PCT/JP2011/060240
§ 371 (c)(1),
(2), (4) Date: Oct. 29, 2012

(87) PCT Pub. No.: WO2011/136263
PCT Pub. Date: Nov. 3, 2011

(65) Prior Publication Data
US 2013/0046074 A1  Feb. 21, 2013

(30) Foreign Application Priority Data

Apr. 30, 2010  (JP) ................................ 2010-105375
Apr. 30, 2010  (JP) ................................ 2010-105614

(51) Int. Cl.
*C08G 69/26* (2006.01)

(52) U.S. Cl.
USPC ........... 528/340; 528/310; 528/332; 528/335; 528/338; 528/339; 528/347; 528/349

(58) Field of Classification Search
CPC ....... C08L 77/06; C08L 77/00; C08G 69/265; C08G 18/73
USPC ......... 528/310, 335, 340, 338, 339, 343, 347, 528/349
See application file for complete search history.

(56) References Cited

U.S. PATENT DOCUMENTS

| 5,223,196 | A | 6/1993 | Shridharani et al. |
| 5,290,850 | A | 3/1994 | Shridharani et al. |
| 5,391,703 | A | 2/1995 | Lin et al. |
| 5,422,420 | A * | 6/1995 | Shridharani ................... 528/349 |
| 5,750,639 | A * | 5/1998 | Hayashi ........................ 528/310 |
| 2004/0198947 | A1 | 10/2004 | Maslanka |
| 2010/0098893 | A1 | 4/2010 | Okushita et al. |
| 2010/0113738 | A1 | 5/2010 | Okushita et al. |

FOREIGN PATENT DOCUMENTS

| JP | 5-506466 A | 9/1993 |
| JP | 6-502671 A | 3/1994 |
| JP | 2006-57033 A | 3/2006 |
| JP | 2006-522208 A | 9/2006 |
| WO | WO 91-13113 A1 | 9/1991 |
| WO | WO 2008/072754 A1 | 6/2008 |
| WO | WO 2008/123534 A1 | 10/2008 |

OTHER PUBLICATIONS

International Preliminary Report on Patentability (Form PCT/IB/373) and the Written Opinion of the International Searching Authority (Form PCT/ISA/237) dated Dec. 10, 2012, issued in corresponding International Application No. PCT/JP2011/060240. (5 pages).

* cited by examiner

*Primary Examiner* — Gregory Listvoyb
(74) *Attorney, Agent, or Firm* — Buchanan, Ingersoll & Rooney PC

(57) ABSTRACT

This is to provide a polyamide resin which can sufficiently ensure all of a relative viscosity ηr (high degree of polymerization), moldable temperature range estimated from a temperature difference (Td−Tm), heat resistance estimated from a melting point Tm, melt moldability estimated from a temperature difference (Tm−Tc), and low water absorbability as compared with the conventional polyoxamide resin.

This is a polyamide resin comprising a dicarboxylic acid-derived unit and a diamine-derived unit being bonded,
wherein the above-mentioned dicarboxylic acid contains oxalic acid (Compound A), and
the above-mentioned diamine contains 1,6-hexanediamine (Compound B) and 2-methyl-1,5-pentanediamine (Compound C).

12 Claims, No Drawings

POLYAMIDE RESIN

TECHNICAL FIELD

The present invention relates to a novel polyamide resin.

BACKGROUND ART

The crystalline polyamides represented by Nylon 6, Nylon 66, etc., have widely been used as a fiber for cloths and industrial materials or general use engineering plastics due to their excellent characteristics and easiness in melt molding, but on the other hand, it has been pointed out the problems that change in physical properties due to water absorption, deterioration in an acid, high temperature alcohol or hot water, etc. Thus, demands for obtaining a polyamide having more excellent dimensional stability and chemical resistance have been heightened.

A polyamide resin using oxalic acid as a dicarboxylic acid component is called as a polyoxamide resin, has been known to have a high melting point and low water absorption rate as compared with the other polyamide resins having the same amino group content (Patent Literature 1), and expected to be utilized in the field where the conventional polyamide can be difficultly used, which involves the problem of changing physical properties due to absorption of water.

Polyoxamide resins using various aliphatic linear diamines as a diamine component have heretofore been proposed. For example, in Non-Patent Literature 1, a polyoxamide resin using 1,6-hexanediamine as a diamine component has been disclosed, in Non-Patent Literature 2, a polyoxamide resin in which a diamine component is 1,9-nonanediamine (hereinafter also referred to PA92) has been disclosed, in Patent Literature 2, a polyoxamide resin using various diamine components and dibutyl oxalate as a dicarboxylic acid ester has been disclosed, in Patent Literature 3, a polyoxamide resin in which two kinds of diamines of 1,9-nonanediamine and 2-methyl-1,8-octanediamine were used as diamine components has been disclosed.

PRIOR ART LITERATURES

Patent Literatures

[Patent Literature 1] JP 2006-57033A
[Patent Literature 2] JP H05-506466A
[Patent Literature 3] WO 2008/072754A

Non-Patent Literatures

[Non-Patent Literature 1] S. W. Shalaby, J. Polym. Sci.,11, 1 (1973)
[Non-Patent Literature 2] L. Franco, et al., Macromolecules, 31, 3912 (1998)

DISCLOSURE OF THE INVENTION

Problems to be Solved by the Invention

However, with regard to the polyoxamide resin disclosed in Non-Patent Literature 1, the melting point (about 320° C.) is close to the thermal decomposition temperature (1% weight decrease temperature under nitrogen; about 310° C.), so that melt polymerization or melt molding is difficult whereby it cannot endure to practical use, with regard to the polyoxamide resin disclosed in Non-Patent Literature 2, there are disclosed a preparation method wherein diethyl oxalate is used as an oxalic acid source and its crystal structure, but PA92 obtained therein is a polymer having an intrinsic viscosity of 0.97 dL/g and a melting point of 246° C., so that a low molecular weight product which cannot mold a tough molded material can only be obtained, with regard to the polyoxamide resin disclosed in Patent Literature 2, there is disclosed that PA92 having an intrinsic viscosity of 0.99 dL/g and a melting point of 248° C. has been prepared, but there is a problem that a low molecular weight product which cannot mold a tough molded material can only be obtained, with regard to the polyoxamide resin disclosed in Patent Literature 3, there is disclosed a polyoxamide resin using two kinds of diamines of 1,9-nonanediamine and 2-methyl-1,8-octanediamine as diamine components with a specific ratio, and these polyoxamide resins have wider moldable temperature range, excellent in molding processability, and also excellent in low water absorbability, chemical resistance, hydrolysis resistance, fuel barrier property, etc., but a melting point is at around 240° C., so that for the uses of electric and electronic equipments which require mold cyclic property and to be high melting point, heat resistance is slightly inferior.

In the prior art literatures mentioned above, there is no specific disclosure about the polyoxamide resin which uses two kinds of diamines of 1,6-hexanediamine and 2-methyl-1,5-pentanediamine as diamine components with a specific ratio.

Problems to be solved by the present invention are to provide a polyamide resin in which a sufficient relative viscosity ηr (hereinafter also referred to relative viscosity ηr) (high degree of polymerization) measured at 25° C. by using a solution of the above-mentioned polyamide resin with a concentration of 1.0 g/dl and 96% sulfuric acid as a solvent, has been accomplished as compared with the conventional polyoxamide resin, a moldable temperature range is wide, which is estimated from a temperature difference (Td−Tm) (° C.) (hereinafter also referred to a temperature difference (Td−Tm)) of a melting point Tm (° C.) (hereinafter also referred to melting point Tm) measured by a differential scanning calorimetry which is measured under nitrogen atmosphere and a heating rate of 10° C./min, and a 1% weight decrease temperature Td (° C.) (thermal decomposition temperature) measured by thermogravimetric analysis under nitrogen atmosphere, and a heating rate of 10° C./min, excellent in heat resistance estimated from a melting point Tm, melt moldability estimated from a temperature difference (Tm−Tc) (° C.) (hereinafter also referred to temperature difference (Tm−Tc)) of a melting point Tm and a crystallization temperature Tc (° C.) measured by a differential scanning calorimetry which is measured under nitrogen atmosphere and a cooling rate of 10° C./min, and low water absorbability, and can reduce molding cycle (Problem 1), in addition to Problem 1, to provide a polyamide resin having wider moldable temperature range and melt moldability in Problem 1, and can ensure low water absorbability appearing in an aliphatic linear polyoxamide resin more stably (Problem 2), and in addition to Problem 1, to provide a polyamide resin having more excellent heat resistance in Problem 1, and excellent in chemical resistance, hydrolysis resistance and fuel barrier property as compared with the conventional aliphatic polyamide resin without impairing low water absorbability appearing in an aliphatic linear polyoxamide resin (Problem 3).

Means to Solve the Problems (1) The first embodiment of the present invention is a polyamide resin which comprises a dicarboxylic acid-derived unit and a diamine-derived unit being bonded,
the above-mentioned dicarboxylic acid contains oxalic acid (Compound A),
the above-mentioned diamine contains 1,6-hexanediamine (Compound B) and 2-methyl-1,5-pentanediamine (Compound C), and preferably having
a relative viscosity $\eta r$ measured at 25° C. by using a solution of the polyamide resin with a concentration of 1.0 g/dl and 96% sulfuric acid as a solvent is 1.8 to 6.0.
(2) The second embodiment of the present invention is a polyamide resin according to the above-mentioned (1), wherein a molar ratio of the above-mentioned Compound B to the above-mentioned Compound C is 50:50 to 1:99 (provided that 50:50 is excluded).
(3) The third embodiment of the present invention is a polyamide resin according to the above-mentioned (1), wherein a molar ratio of the above-mentioned Compound B to the above-mentioned Compound C is 99:1 to 50:50.

Effects of the Invention

According to the present invention, it can provide a polyamide resin
which can accomplish a sufficient relative viscosity $\eta r$ (high degree of polymerization) as compared with the conventional polyoxamide resin,
has a wide moldable temperature range estimated from a temperature difference (Td−Tm),
excellent heat resistance estimated from a melting point Tm, and
melt moldability estimated from a temperature difference (Tm−Tc) (Effect 1),
in addition to Effect 1, it can provide a polyamide resin which has a wider moldable temperature range and melt moldability in Effect 1, and ensures low water absorbability appearing in an aliphatic linear polyoxamide resin more stably (Effect 2), and
in addition to Effect 1, it can provide a polyamide resin which has more excellent heat resistance in Effect 1, and has excellent chemical resistance, hydrolysis resistance and fuel barrier property as compared with the conventional aliphatic polyamide resin without impairing low water absorbability appearing in an aliphatic linear polyoxamide resin.

BEST MODE TO CARRY OUT THE INVENTION

The polyamide resin of the first embodiment of the present invention (hereinafter also referred to the first embodiment polyamide resin) is a polyamide resin wherein
a dicarboxylic acid component is oxalic acid, and diamine components are 1,6-hexanediamine and 2-methyl-1,5-pentanediamine, i.e.,
a unit derived from the dicarboxylic acid and a unit derived from the diamine are bonded,
a polyamide resin wherein the above-mentioned dicarboxylic acid contains oxalic acid (Compound A), and
the above-mentioned diamine contains 1,6-hexanediamine (Compound B) and 2-methyl-1,5-pentanediamine (Compound C), and
preferably a polyamide resin wherein a relative viscosity $\eta r$ measured at 25° C. by using a solution of the above-mentioned polyamide resin with a concentration of 1.0 g/dl and 96% sulfuric acid as a solvent is 1.8 to 6.0.

The polyamide resin of the second embodiment of the present invention (hereinafter also referred to the second embodiment polyamide resin) is a polyamide resin, wherein a molar ratio of the above-mentioned Compound B to the above-mentioned Compound C is 50:50 to 1:99 (provided that 50:50 is excluded) in the above-mentioned first embodiment polyamide resin.

The polyamide resin of the third embodiment of the present invention (hereinafter also referred to the third embodiment polyamide resin) is a polyamide resin, wherein a molar ratio of the above-mentioned Compound B to the above-mentioned Compound C is 99:1 to 50:50 in the above-mentioned first embodiment polyamide resin.

[First Embodiment Polyamide Resin]

In the following, the first embodiment polyamide resin will be explained in detail, and the explanation also commonly corresponds to the second embodiment polyamide resin and the third embodiment polyamide resin.

(1) Compounds A, B and C

In the preparation of the first embodiment polyamide resin, if Compound A (oxalic acid) is directly used as a starting material, Compound A (oxalic acid) itself is thermally decomposed, and a melting point of the first embodiment polyamide resin exceeds the thermal decomposition temperature, so that at the time of the preparation, an oxalic acid source compound (hereinafter also referred to an oxalic acid source) is used, and the oxalic acid derived from the oxalic acid source and diamines are subjected to polycondensation to give the product. The oxalic acid is an oxalic acid source derived such as an oxalic acid diester, etc., and may be any material so long as it has reactivity with an amino group.

As the oxalic acid source, an oxalic acid diester is preferred from the viewpoint of controlling side reactions in the polycondensation reaction, and there may be mentioned an oxalic acid diester of an aliphatic monovalent alcohol such as dimethyl oxalate, diethyl oxalate, di-n-(or i-)propyl oxalate, di-n-(or i-, or t-)butyl oxalate, etc., an oxalic acid diester of an alicyclic alcohol such as dicyclohexyl oxalate, etc., and an oxalic acid diester of an aromatic alcohol such as diphenyl oxalate, etc.

Among the oxalic acid diesters, further preferred are an oxalic acid diester of an aliphatic monovalent alcohol, an oxalic acid diester of an alicyclic alcohol, and an oxalic acid diester of an aromatic alcohol, carbon atoms of which exceeds 3,
among these, dibutyl oxalate and diphenyl oxalate are further preferred, and
dibutyl oxalate is further preferred.

As the diamine components, a mixture of 1,6-hexanediamine which is Compound B and 2-methyl-1,5-pentanediamine which is Compound C is used.

To obtain a polyamide having a wide moldable temperature range, excellent in melt moldability, and also excellent in low water absorbability, chemical resistance, hydrolysis resistance, fuel barrier property, etc., and from the viewpoint of constituting the second embodiment polyamide resin and the third embodiment polyamide resin mentioned below, a molar ratio of Compound B to Compound C is, in terms of a mol % ratio, preferably 99:1 to 1:99,
more preferably 97:3 to 3:97,
further preferably 95:5 to 5:95,
further preferably 90:10 to 10:90, and
further preferably 85:15 to 10:90.

Incidentally, in the following, the molar ratio of Compound B to Compound C also means a molar ratio of a unit derived from Compound B to a unit derived from Compound C in the polyamide resin.

(2) Relative Viscosity of the First Embodiment Polyamide Resin

The first embodiment polyamide resin uses
oxalic acid which is Compound A as a carboxylic acid component, and
by subjecting to polycondensation with 1,6-hexanediamine which is Compound B and 2-methyl-1,5-pentanediamine which is Compound C as diamine components, it can be made the melting point preferably in the range of 200 to 330° C., and realize a high degree of polymerization (which is to increase a relative viscosity) as compared with the polyamide resin the melting point of which exceeds 330° C. obtained by polycondensation of Compound A and Compound B (hereinafter also referred to Comparative polyamide resin 2), since it is not necessary to make the conditions excessively high temperature which cause side reaction and inhibit to make high degree of polymerization in the melt polymerization at the post-polymerization step of the polyamide resin mentioned below.

Accordingly, the first embodiment polyamide resin can increase the relative viscosity as compared with those of the conventional polyamide resins, so that it has excellent melt moldability.

From the viewpoints of avoiding tendencies that the molded product after melt molding becomes brittle to lower the physical properties, and avoiding tendencies that the melt viscosity at the melt molding becomes high to worsen molding processability, a relative viscosity ηr measured at 25° C. by using a solution of the first embodiment polyamide resin with a concentration of 1.0 g/dl by 96% conc. sulfuric acid can be preferably made 1.8 to 6.0, more preferably 1.8 to 4.5, further preferably 1.8 to 3.5, and further preferably 1.8 to 3.0. Incidentally, in the melt polymerization at the post-polymerization step of the polyamide resin mentioned below, by heightening the degree of the reduced pressure, the relative viscosity ηr can be increased.

Also, from the similar viewpoints, the melt viscosity of the first embodiment polyamide resin is preferably 100 to 600 Pa·s, more preferably 120 to 600 Pa·s, further preferably 130 to 590 Pa·s, and the number average molecular weight of the first embodiment polyamide resin is preferably 10000 to 50000, more preferably 11000 to 30000, further preferably 11000 to 25000.

(3) Thermal Characteristics and Low Water Absorbability of the First Embodiment Polyamide Resin The polyamide resin of the first embodiment can be further made, by changing the polycondensation ratio of Compounds B to C,
the temperature difference (Td−Tm) larger as compared with that of Comparative polyamide resin 2, and smaller than that of Comparative polyamide resin 1,
the melting point Tm lower than that of Comparative polyamide resin 2, and higher than the polyamide resin (hereinafter also referred to Comparative polyamide resin 1) obtained by polycondensation of Compound A and Compound C,
the crystallization temperature Tc lower than that of Comparative polyamide resin 2, and higher than that of Comparative polyamide resin 1,
the crystallization initiating temperature Ts lower than that of Comparative polyamide resin 2, and higher than that of Comparative polyamide resin 1,
the 1% weight decrease temperature Td higher than that of Comparative polyamide resin 1,
the temperature difference (Tm−Tc) larger than that of Comparative polyamide resin 2, and the same or smaller than that of Comparative polyamide resin 1, and
the saturated water absorption rate smaller than that of Comparative polyamide resin 2, and larger than that of Comparative polyamide resin 1.

That is, the first embodiment polyamide resin can ensure all of
a relative viscosity ηr (high degree of polymerization),
a moldable temperature range estimated from a temperature difference (Td−Tm),
heat resistance estimated from a melting point Tm,
melt moldability estimated from a temperature difference (Tm−Tc),
a mold cycle time estimated from a crystallization initiating temperature Ts be shortened (hereinafter also referred to mold cyclic property), and
low water absorbability, as compared with the conventional polyoxamide resin.

In the first embodiment polyamide resin, from the viewpoints of sufficiently ensuring all of the moldable temperature range, heat resistance, melt moldability, mold cyclic property and low water absorbability,
Tm is preferably 200 to 330° C., more preferably 200 to 326° C.,
Td is preferably 331 to 370° C., more preferably 333 to 365° C.,
Tc is preferably 154 to 305° C., more preferably 154 to 303° C.,
Ts is preferably 162 to 314° C., more preferably 165 to 308° C.,
the temperature difference (Td−Tm) is preferably 10 to 150° C., more preferably 20 to 140° C., further preferably 25 to 140° C.,
the temperature difference (Tm−Tc) is preferably 23 to 46° C., more preferably 24 to 46° C., and
the saturated water absorption rate is preferably 2.1 to 2.4.

Incidentally,
Tc is suitably within the above-mentioned range from the viewpoint of making a solidification rate suitable and ensuring a melt moldability.

The temperature difference (Tm−Tc) is suitably within the above-mentioned range from the viewpoint of controlling a mold cycle time and ensuring productivity, and from the viewpoint of controlling suitable degree of crystallization rate and ensuring the physical properties of the molded product.

(4) Preparation of the First Embodiment Polyamide Resin

The polyamide resin of the present invention can be prepared by using an optional method which has been known as the method for preparing the polyamide, and from the viewpoints of high degree of polymerization and productivity, it can be preferably carried out by subjecting the diamines and the oxalic acid diester to polycondensation reaction with a batch system or continuous system.

More specifically, it is more preferred to carry out in the order of (i) a pre-polycondensation step, and (ii) a post-polycondensation step as shown in the following operations.

(i) Pre-polycondensation step: The inside of the reactor is firstly replaced by nitrogen, diamines (Compounds B and C) and an oxalic acid diester which is an oxalic acid source of Compound A are mixed. At the time of the mixing, a solvent in which the diamines and the oxalic acid diester are both soluble may be used. The solvent in which the diamine components and the oxalic acid source component are both soluble may be used toluene, xylene, trichlorobenzene, phenol, trifluoroethanol, etc., and toluene can be particularly preferably used. For example, a toluene solution in which the diamines are dissolved is heated to 50° C., and the oxalic acid diester is added thereto.

At this time, a charging ratio of the oxalic acid diester to the above-mentioned diamines is, from the viewpoint of high degree of polymerization, the oxalic acid diester/the above-mentioned diamines of 0.8 to 1.5 (molar ratio), preferably 0.91 to 1.1 (molar ratio), and further preferably 0.99 to 1.01 (molar ratio).

The temperature of the materials is raised under normal pressure while stirring and/or nitrogen bubbling the thus charged materials in the reactor. The reaction temperature is preferably so controlled that the finally reaching temperature becomes in the range of 80 to 150° C., preferably 100 to 140° C. The reaction time at the finally reaching temperature is 3 hours to 6 hours.

(ii) Post-polycondensation step: To further establish the high degree of polymerization, the polymerization product formed in the pre-polycondensation step is gradually heated under normal pressure in the reactor. During the heating step, from the finally reached temperature of the pre-polycondensation step, i.e., preferably from 80 to 150° C., to finally, reaching to the temperature range of preferably 215° C. or higher and 350° C. or lower, more preferably 225° C. or higher and 350° C. or lower, further preferably 230° C. or higher and 345° C. or lower, further preferably 230° C. or higher and 340° C. or lower in case of the first embodiment, further, in case of the second embodiment, reaching to the temperature range of preferably 215° C. or higher and 300° C. or lower, more preferably 225° C. or higher and 290° C. or lower, further preferably 230° C. or higher and 280° C. or lower, further, in case of the third embodiment, reaching to the temperature range of preferably 295° C. or higher and 350° C. or lower, more preferably 298° C. or higher and 345° C. or lower, further preferably 298° C. or higher and 340° C. or lower.

The reaction is preferably carried out by maintaining preferably for 1 to 8 hours, more preferably 2 to 6 hours including the heating time. Furthermore, in the post-polymerization step, polymerization may be carried out under reduced pressure, if necessary. The preferred finally reaching pressure is less than 0.1 MPa to 13.3 Pa when the polymerization under reduced pressure is carried out.

(5) Component which can be Used as the Dicarboxylic Acid of the First Embodiment Polyamide Resin In the first embodiment polyamide resin, other dicarboxylic acid component(s) than Compound A can be used within the range which does not impair the effects of the present invention.

The dicarboxylic acid component other than Compound A (oxalic acid) may be mentioned, aliphatic dicarboxylic acids such as malonic acid, dimethylmalonate, succinic acid, glutaric acid, adipic acid, 2-methyladipate, trimethyladipate, pimelic acid, 2,2-dimethylglutarate, 3,3-diethylsuccinate, azelaic acid, sebacic acid, suberic acid, etc., also, alicyclic dicarboxylic acids such as 1,3-cyclopentanedicarboxylic acid, 1,4-cyclohexanedicarboxylic acid, etc., further, aromatic dicarboxylic acids such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, dibenzoic acid, 4,4'-oxydibenzoic acid, diphenylmethane 4,4'-dicarboxylic acid, diphenylsulfone 4,4'-dicarboxylic acid, 4,4'-biphenyldicarboxylic acid, etc., each singly, or an optional mixture thereof may be added at the time of the polycondensation reaction.

Further, a polyvalent carboxylic acid such as trimellitic acid, trimesic acid, pyromellitic acid, etc., may be used within the range where the melt molding is possible.

When the other dicarboxylic acid component is to be used, its ratio is 25 mol % or less based on the amount of Compound A (oxalic acid), preferably 15 mol % or less, more preferably 10 mol % or less, further preferably 5 mol % or less, further preferably 0 mol % (That is, the dicarboxylic acid component consists of Compound A). Incidentally, a molar ratio of the other dicarboxylic acid component to Compound A (oxalic acid) means a molar ratio of the other dicarboxylic acid component-derived unit to Compound A-derived unit in the polyamide resin.

In the first embodiment polyamide resin, other diamine component(s) than Compounds B and C may be used within the range which does not impair the effects of the present invention.

As the other diamine components than 1,6-hexanediamine and 2-methyl-1,5-pentanediamine, there may be added an aliphatic diamine such as ethylene diamine, propylene diamine, 1,4-butane diamine, 1,9-nonane diamine, 2-methyl-1,8-octanediamine, 1,8-octanediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine, 5-methyl-1,9-nonanediamine, etc., further, alicyclic diamines such as cyclohexanediamine, methylcyclohexanediamine, isophoronediamine, etc., moreover, aromatic diamines such as p-phenylenediamine, m-phenylenediamine, p-xylenediamine, m-xylenediamine, 4,4'-diaminodiphenylmethane, 4,4'-diaminodiphenylsulfone, 4,4'-diaminodiphenyl ether, etc., each singly, or an optional mixture thereof may be added at the time of the polycondensation reaction.

When the other diamine components are used, its ratio is 25 mol % or less based on those of Compounds B and C, preferably 15 mol % or less, more preferably 10 mol % or less, further preferably 5 mol % or less, and further more preferably 0 mol % (i.e., the diamine component consists of Compounds B and C, alone). Incidentally, a molar ratio of the other diamine component(s) to the amounts of Compounds B and C also means a molar ratio of the unit(s) derived from the other diamine component(s) to the units derived from Compounds B and C in the polyamide resin.

In the first embodiment polyamide resin, it is possible to mix other polyoxamide(s), or polyamides such as an aromatic polyamide, aliphatic polyamide, alicyclic polyamide, etc., within the range which does not impair the effects of the present invention.

To the first embodiment polyamide resin, it is possible to formulate a thermo-plastic polymer other than the polyamide, an elastomer, a filler, a reinforcing fiber, or various kinds of additives similarly.

Moreover, to the first embodiment polyamide resin, depending on necessity, it may be added a stabilizer such as a copper compound, etc., a colorant, a UV-absorber, a photostabilizer, an antioxidant, an antistatistic, a flame retardant, a crystallization promoter, a glass fiber, a plasticizer, a lubricant, etc., at the time of the polycondensation reaction, or after the same.

(6) Molding of the First Embodiment Polyamide Resin

As the molding method of the polyamide resin obtained by the present invention, all the conventionally known molding methods applied to the polyamide such as injection, extrusion, blow, press, roller, expansion, vacuum•pressure, elongation, etc., can be used, and it can be fabricated to a film, a sheet, a molded product, a fiber, etc., by these molding methods.

(7) Use of the Molded Product of the First Embodiment Polyamide

The molded product of the polyamide obtained by the present invention can be used for wide uses such as automobile members, computer and its related equipments, optical instrument members, electric and electronic equipments, information and communication equipments, precision instruments, civil engineering and construction instruments, medical supplies, household commodities, etc., as various kinds of molded products, sheet, film, pipe, tube, monofilament, fiber, container, etc., to which the conventional polyamide molded products have been used.

[Second Embodiment Polyamide Resin]

(1) Constitutional Components of the Second Embodiment Polyamide Resin

The second embodiment polyamide resin is a resin in the first embodiment polyamide resin wherein the molar ratio of Compound B to Compound C is 50:50 to 1:99 (provided that the ratio of 50:50 is excluded).

The second embodiment polyamide resin can provide a polyamide resin which has a high molecular weight, and among the first embodiment polyamide resins, has a high melting point, larger difference between the melting point and the thermal decomposition temperature, excellent in melt moldability, and ensures low water absorbability appearing in an aliphatic linear polyoxamide resin more stably by using Compounds A, B and C having such constitutions, preferably by subjecting to polycondensation using the mixture thereof.

In the second embodiment polyamide resin, from the viewpoints of ensuring high melting point, melt moldability and low water absorbability, a molar ratio of Compound B to Compound C is, preferably 50:50 to 3:97 mol % (provided that the ratio of 50:50 is excluded), more preferably 48:52 to 3:97 mol %,
further preferably 45:55 to 5:95 mol %,
further preferably 40:60 to 5:95 mol %,
further preferably 35:65 to 5:95 mol %,
further preferably 30:70 to 5:95 mol %,
further preferably 30:70 to 10:90 mol %, and
further preferably 25:75 to 10:90 mol %.

(2) Relative Viscosity ηr of the Second Embodiment Polyamide Resin

The second embodiment polyamide resin is particularly suitable for the uses such as tube and monofilament for which higher relative viscosity ηr and melt viscosity are preferred, and from the viewpoints of controlling lowering in brittleness of the molded product and ensuring molding processability, the relative viscosity ηr of the second embodiment polyamide resin is preferably 2.2 to 6.0, more preferably 2.3 to 5.0, further preferably 2.4 to 4.0, further preferably 2.5 to 3.0, and further preferably 2.5 to 2.7, and the melt viscosity of the second embodiment polyamide resin is preferably 300 to 600 Pa·s, more preferably 400 to 600 Pa·s, further preferably 450 to 600 Pa·s, and further preferably 500 to 600 Pa·s.

(2) Thermal Characteristics and Low Water Absorbability of the Second Embodiment Polyamide Resin The second embodiment polyamide resin has, among the resins of the first embodiment, low Tm, so that high degree of polymerization (increase in relative viscosity) can be easily accomplished, to enlarge the moldable temperature range represented by the temperature difference (Td−Tm), also low Tc, so that the melt moldability estimated from the temperature difference (Tm−Tc) is increased, and further shows stable low water absorbability.

In the second embodiment polyamide resin, in addition to ensure all the moldable temperature range, heat resistance and melt moldability sufficiently, from the viewpoints of ensuring the temperature difference (Td−Tm), the temperature difference (Tm−Tc) and stable low water absorbability, Tm is preferably 200 to 260° C., more preferably 200 to 250° C., further preferably 200 to 240° C., further preferably 200 to 230° C., further preferably 200 to 220° C., further preferably 200 to 210° C., and further preferably 200 to 205° C., Td is preferably 331 to 355° C., more preferably 333 to 350° C., and further preferably 333 to 345° C., Tc is preferably 154 to 230° C., more preferably 154 to 210° C., further preferably 154 to 190° C., further preferably 154 to 180° C., and further preferably 154 to 170° C., the temperature difference (Td−Tm) is preferably 96 to 150° C., more preferably 100 to 150° C., further preferably 110 to 140° C., further preferably 120 to 140° C., and further preferably 130 to 140° C., the temperature difference (Tm−Tc) is preferably 34 to 46° C., more preferably 34 to 43° C., and the saturated water absorption rate is preferably 2.1 to 2.3, more preferably 2.1 to 2.2, further preferably 2.1 to 2.15.

Incidentally,

Tc is suitably within the above-mentioned range from the viewpoint of ensuring melt moldability with a moderate solidification rate.

The temperature difference (Tm−Tc) is suitably within the above-mentioned range from the viewpoint of controlling a mold cycle time, and ensuring productivity, and from the viewpoint of controlling suitable degree of crystallization rate, and ensuring the physical properties of the molded product.

(3) Molding of the Second Embodiment Polyamide Resin

As the molding method of the second embodiment polyamide resin, all the conventionally known molding methods applied to the polyamide such as injection, extrusion, blow, press, roller, expansion, vacuum•pressure, elongation, etc., can be used, above all, molding by extrusion and solvent cast is suitable from the viewpoint of high relative viscosity, high melt viscosity and solvent solubility, and it can be fabricated to a film, a sheet, a molded product, a fiber, etc., by these molding methods.

(4) Use of the Molded Product of the Second Embodiment Polyamide

The molded product of the polyamide obtained by the present invention can he used for wide uses such as automobile members, computer and its related equipments, optical instrument members, electric and electronic equipments, information and communication equipments, precision instruments, civil engineering and construction instruments, medical supplies, household commodities, etc., as various kinds of molded products, sheet, film, pipe, tube, monofilament, fiber, container, etc., to which the conventional polyamide molded products have been used. Above all, from the viewpoint of extrusion molding property, it is suitable for the uses of automobile members as a tube or monofilament.

[Third Embodiment Polyamide Resin]

(1) Constitutional Components of the Third Embodiment Polyamide Resin

The polyamide resin of the third embodiment has a molar ratio of Compound B to Compound C in the first embodiment polyamide resin of 99:1 to 50:50.

The third embodiment polyamide resin has a high molecular weight, high melting point in the first embodiment polyamide resins, larger difference between the melting point and the thermal decomposition temperature, excellent melt moldability, and excellent chemical resistance, hydrolysis resistance and fuel barrier property as compared with the conventional polyamide without impairing low water absorbability appearing in a linear polyoxamide resin more stably by using Compounds A, B and C having such constitutions, preferably by subjecting to polycondensation using the mixture thereof.

In the third embodiment polyamide resin, in particular, from the viewpoint of ensuring chemical resistance, hydrolysis resistance and fuel barrier property, a molar ratio of Compound B to Compound C is, preferably 99:1 to exceeding 50 mol %:less than 50 mol %,
more preferably 99:1 to 60:40 mol %,
further preferably 97:3 to 65:35 mol %,
further preferably 95:5 to 65:35 mol %,
further preferably 90:10 to 65:35 mol %, and
further preferably 85:15 to 70:30 mol %.

(2) Relative Viscosity ηr of the Third Embodiment Polyamide Resin

The third embodiment polyamide resin is particularly suitable for the uses such as automobile members and electric and electronic equipments which require to have a certain degree or more of the relative viscosity ηr and melt viscosity but preferably not so excessively high, and from such viewpoints, the relative viscosity ηr of the third embodiment polyamide resin is preferably 1.8 to 6.0, more preferably 1.8 to 3.0, further preferably 1.85 to 2.5, and further preferably 1.85 to 2.2, the melt viscosity of the third embodiment polyamide resin is preferably 100 to 300 Pa·s, more preferably 110 to 250 Pa·s, further preferably 120 to 250 Pa·s, further preferably 120 to 230 Pa·s, further preferably 130 to 230 Pa·s, further preferably 130 to 220 Pa·s, further preferably 150 to 220 Pa·s, further preferably 160 to 220 Pa·s, and further preferably 160 to 200 Pa·s.

(3) Thermal Characteristics, Low Water Absorbability, Chemical Resistance, Hydrolysis Resistance and Fuel Barrier Property of the Third Embodiment Polyamide Resin The third embodiment polyamide resin ensures all of the moldable temperature range, heat resistance, melt moldability and low water absorbability sufficiently, and is particularly excellent in chemical resistance, hydrolysis resistance and fuel barrier property which are derived from high polymerization ratio (molar ratio) of Compound B among the first embodiment resins.

In the third embodiment polyamide resin, from the viewpoint of ensuring all of the moldable temperature range, heat resistance, melt moldability and low water absorbability sufficiently, Tm is preferably 260 to 330° C., more preferably 265 to 330° C., Td is preferably 341 to 370° C., more preferably 345 to 370° C., and further preferably 350 to 365° C., Tc is preferably 231 to 305° C., more preferably 231 to 303° C., the temperature difference (Td−Tm) is preferably 10 to 95° C., more preferably 20 to 95° C., further preferably 25 to 95° C., the temperature difference (Tm−Tc) is preferably 23 to 33° C., and the saturated water absorption rate is preferably 2.3 to 2.4.

Incidentally,

Tc is suitably within the above-mentioned range from the viewpoint of ensuring melt moldability with a moderate solidification rate.

The temperature difference (Tm−Tc) is suitably within the above-mentioned range from the viewpoint of controlling a mold cycle time and ensuring productivity, and from the viewpoint of controlling suitable degree of crystallization rate, and ensuring the physical properties of the molded product.

(3) Molding of the Third Embodiment Polyamide Resin

As the molding method of the third embodiment polyamide resin, all the conventionally known molding methods applied to the polyamide such as injection, extrusion, blow, press, roller, expansion, vacuum•pressure, elongation, etc., can be used, above all, molding by injection molding is suitable from the viewpoint of shortening the molding cycle time, and it can be fabricated to a film, a sheet, a molded product, a fiber, etc., by these molding methods.

(4) Use of the Polyamide Molded Product of the Third Embodiment

The molded product of the polyamide obtained by the present invention can be used for wide uses such as automobile members, computer and its related equipments, optical instrument members, electric and electronic equipments, information and communication equipments, precision instruments, civil engineering and construction instruments, medical supplies, household commodities, etc., as various kinds of molded products, sheet, film, pipe, tube, monofilament, fiber, container, etc., to which the conventional polyamide molded products have been used. Above all, it is suitable for the uses of electric and electronic equipments from the viewpoints of mold cyclic property and high melting point, and is suitable for the uses of automobile members such as a radiator tank, fan, quick connector, fuel tank, fuel tube, etc., from the viewpoints of chemical resistance, hydrolysis resistance and fuel barrier property.

EXAMPLES

[Measurement of Physical Property, Molding, Evaluation Method]

In the following, the present invention will be explained more specifically by referring to Examples, but the present invention is not limited by these. Incidentally, measurements of a relative viscosity, number average molecular weight, melting point, crystallization temperature, 1% weight decrease temperature , melt viscosity and saturated water absorption rate, and evaluations of chemical resistance, hydrolysis resistance and fuel barrier property in Examples were carried out by the following methods.

(1) Relative Viscosity ηr

ηr was measured by using a 96% sulfuric acid solution (concentration: 1.0 g/dl) of the polyamide with an Ostwald type viscometer at 25° C.

(2) Number Average Molecular Weight (Mn)

The number average molecular weight (Mn) is based on the signal intensities obtained by $^1$H-NMR spectrum, and calculated by the following formula, in the case of a polyamide [hereinafter abbreviated to PA62 (Compound B/Compound C=90/10)] prepared by using dibutyl oxalate as an oxalic acid source, and 1,6-hexanediamine (Compound B) and 2-methyl-1,5-pentanediamine (Compound C) with a mol % ratio of 90:10 as diamine components.

$$Mn = np \times 170.21 + n(NH_2) \times 115.20 + n(OBu) \times 129.13 + n(NHCHO) \times 29.14$$

Incidentally, the measurement conditions of $^1$H-NMR were as follows.
Used machine: AVANCE 500 manufactured by Bruker BioSpin K.K.
Solvent: deuterated sulfuric acid
Number of integrated times: 1024 times
Also, each item in the above-mentioned formula is defined as mentioned below.
np=Np/[(N(NH$_2$)+N(NHCHO)+N(OBu))/2]
n(NH$_2$)=N(NH$_2$)/[(N(NH$_2$)+N(NHCHO)+N(OBu))/2]
n(NHCHO)=N(NHCHO)/[(N(NH$_2$)+N(NHCHO)+N(OBu))/2]
n(OBu)=N(OBu)/[(N(NH$_2$)+N(NHCHO)+N(OBu))/2]
Np=Sp/sp−N(NHCHO)
N(NH$_2$)=S(NH$_2$)/s(NH$_2$)
N(NHCHO)=S(NHCHO)/s(NHCHO)
N(OBu)=S(OBu)/s(OBu)
Provided that each item has the following meaning.
Np: Total number of repeating units in the molecular chain of PA62 (Compound B/Compound C=90/10) excluding terminal units.
np: Number of repeating unit in the molecular chain per one molecule.
Sp: Integrated value of signal (around 3.1 ppm) based on the proton of the methylene group adjacent to the oxamide group in the repeating unit in the molecular chain of PA62 (Compound B/Compound C=90/10) excluding terminals.
sp: Number of hydrogens (4) counted by the integrated value Sp.
N(NH$_2$): Total number of the terminal amino groups of PA62 (Compound B/Compound C=90/10).
n(NH$_2$): Number of the terminal amino groups per one molecule.
S(NH$_2$): Integrated value of signal (around 2.6 ppm) based on the proton of the methylene group adjacent to the terminal amino group of PA62 (Compound B/Compound C=90/10).
s(NH$_2$): Number of hydrogens (2) counted by the integrated value S(NH$_2$).
N(NHCHO): Total number of the terminal formamide groups of PA62 (Compound B/Compound C=90/10).
n(NHCHO): Number of the terminal formamide groups per one molecule.
S(NHCHO): Integrated value of signal (7.8 ppm) based on the proton of the formamide group of PA62 (Compound B/Compound C=90/10).
s(NHCHO): Number of hydrogen (1) counted by the integrated value S(NHCHO).
N(OBu): Total number of the terminal butoxy groups of PA62 (Compound B/Compound C=90/10).
n(OBu): Number of the terminal butoxy groups per one molecule.
S(OBu): Integrated value of signal (around 4.1 ppm) based on the proton of the methylene group adjacent to the oxygen atom at the terminal butoxy group of PA62 (Compound B/Compound C=90/10).
s(OBu): Number of hydrogens (2) counted by the integrated value S(OBu).
(2) Melting Point Tm, Crystallization Temperature Tc and Crystallization Initiating Temperature Ts Tm and Tc were measured by using PYRIS Diamond DSC manufactured by PerkinElmer under nitrogen atmosphere.
Tm and Tc of Examples 1 to 5 and Comparative example 1 were
raised from 30° C. to 310° C. with a rate of 10° C./min (called as heating-first run),
maintained at 310° C. for 3 minutes, then, cooled to −100° C. with a rate of 10° C./min (called as cooling-first run), and
then, raised to 310° C. with a rate of 10° C./min (called as heating-second run).
From the obtained DSC chart, the exothermic peak temperature of the cooling-first run is made Tc, and
the endothermic peak temperature of the heating-second run is made Tm.
Tm and Tc of Examples 6 to 10 and Comparative example 2 were
raised from 30° C. to 350° C. with a rate of 10° C./min (called as heating-first run),
maintained at 350° C. for 3 minutes, then, cooled to −100° C. with a rate of 10° C./min (called as cooling-first run), and
then, raised to 350° C. with a rate of 10° C./min (called as heating-second run).
From the obtained DSC chart, the exothermic peak temperature of the cooling-first run is made Tc, and
the endothermic peak temperature of the heating-second run is made Tm.
Ts is a point which crosses each extrapolation of the raising portion of the exothermic peak of the cooling-first run and that of the base line as Ts.
(3) 1% Weight Decrease Temperature Td
Td was measured by using THERMOGRAVIMETRIC ANALYZER TGA-50 manufactured by SHIMADZU Corporation, and measured by thermogravimetric analysis (TGA).
The temperature was raised from room temperature to 500° C. with a heating rate of 10° C./min under nitrogen stream with 20 ml/min, and Td was measured.
(4) Melt Viscosity
The melt viscosity was measured by using a melt viscoelastic measurement device ARES manufactured by TA Instruments Japan Inc., in nitrogen, at 280° C. (Examples 1 to 4 and Example 5) or 340° C. (Examples 6 to 10), under the conditions of shear velocity of 0.1 sec$^{-1}$.
(5) Film Molding
In Examples 1 to 5 and Comparative example 1,
film molding was carried out by using a vacuum press machine TMB-10 manufactured by TOHO MACHINARY CO., LTD.
Materials were melted under heating at 280° C. for 5 minutes under reduced pressure atmosphere of 500 to 700 Pa, and then, press was carried out at 5 MPa for 1 minute to carry out film molding.
Next, the reduced pressure atmosphere was returned to normal pressure, and then, the material was crystallized by cooling at room temperature under 5 MPa for 1 minute to obtain a film.
In Examples 6 to 10 and Comparative example 2,
film molding was carried out by using a vacuum press machine TMB-10 manufactured by TOHO MACHINARY CO., LTD.
Materials were melted under heating at 340° C. for 5 minutes under reduced pressure atmosphere of 500 to 700 Pa, and then, press was carried out at 5 MPa for 1 minute to carry out film molding.
Next, the reduced pressure atmosphere was returned to normal pressure, and then, the material was crystallized by cooling at room temperature under 5 MPa for 1 minute to obtain a film.

(6) Saturated Water Absorption Rate

A film (size: 20 mm×10 mm, thickness 0.25 mm; weight: about 0.05 g) molded the polyamide resin under the conditions of (5) was dipped in deionized water at 23° C., and the film was taken out at each predetermined time to measure the weight of the film.

When the increased ratio of the film weight was within 0.2% with 3 continuous measurements, then it was judged that absorption of water to the polyamide resin film was reached to saturation, whereby a saturated water absorption rate (%) was calculated from the weight (X g) of the film before dipping it in water and the weight (Y g) of the film reached to the saturation according to the formula (1).

[Numeral formula 1]

$$\text{Saturated water absorption rate (\%)} = \frac{Y-X}{X} \times 100 \quad (1)$$

(7) Chemical Resistance

The hot press films of the polyamide obtained by the present invention were dipped in the chemicals enumerated below for 7 days, and then, changes in a weight remaining rate (%) of the film and appearance were observed.

Tests were carried out with respect to each solution of conc. hydrochloric acid, 64% sulfuric acid, 30% aqueous sodium hydroxide solution and 5% aqueous potassium permanganate solution at 23° C., and for benzyl alcohol at 50° C. with respect to the dipped samples.

(8) Hydrolysis Resistance

The hot press films of the polyamide obtained by the present invention were charged in an autoclave, and each was treated in water, 0.5 mol/l sulfuric acid and 1 mol/l aqueous sodium hydroxide solution at 121° C. for 60 minutes, then, a weight remaining rate (%) and change in appearance were examined.

(9) Fuel Barrier Property

In a vessel made of stainless was charged 50 ml of fuel E10 (toluene/isooctane/ethanol=45/45/10 vol %), by using the film molded by the conditions of (5), a lid was put on the vessel by inserting a gasket made of PTFE, and tightened by a screw pressure. The vessel was put in a thermostat chamber at 60° C., and nitrogen was flown in the chamber with 50 ml/min. Change in the weight with a lapse of time was measured, and at the time at which the weight change per a unit time became stable, a fuel transmission coefficient was calculated from the formula (2). A transmitted area of the tested sample was 78.5 cm².

Fuel transmission coefficient (g·mm/m²day)=[Transmitted weight (g)×Film thickness (mm)]/[Transmitted area (m²)×Number of days (day)] (2)

Example 1

(i) Pre-polycondensation step: Inside of a separable flask having an inner volume of 1 L, and equipped with a stirrer, a reflux condenser, a nitrogen-inlet tube and a starting materials-inlet port was replaced by a nitrogen gas with a purity of 99.9999%, and 500 ml of dehydrated toluene, 1.7615 g (0.0152 mol) of 1,6-hexanediamine, and 56.9544 g (0.4901 mol) of 2-methyl-1,5-pentanediamine were charged therein.

The separable flask was placed in an oil bath, and after raising the temperature to 50° C., 102.1956 g (0.5053 mol) of dibutyl oxalate was charged.

Next, the temperature of the oil bath was raised to 130° C., and the reaction was carried out under reflux for 5 hours.

Incidentally, all the operations from charging starting materials to completion of the reaction were carried out under nitrogen stream with 50 ml/min (ii) Post-polycondensation step: The pre-polymerization product obtained by the above-mentioned operation was charged in a reaction tube made of a glass, equipped with a stirrer, an air-cooling tube and a nitrogen-inlet tube, and having a diameter of about 35 mmφ, and after repeating the operation five times that inside of the reaction tube was maintained at a reduced pressure of 13.3 Pa, then, a nitrogen gas was introduced to the normal pressure, it was transferred to a salt bath maintained at 210° C. under nitrogen stream of 50 ml/min, and heating was immediately started. The temperature of the salt bath was raised to 260° C. over 1 hour, and inside of the vessel was reduced to about 66.5 Pa, and the product was reacted for further 2 hours.

Subsequently, a nitrogen gas was introduced until normal pressure, the product was then taken out from the salt bath and cooled to room temperature under a nitrogen stream of 50 ml/min to obtain a polyamide resin.

The obtained polyamide was a white tough polymer.

Example 2

The reaction was carried out in the same manner as in Example 1 except for using a separable flask having a volume of 500 mL, and charging 200 ml of dehydrated toluene, 1.7349 g (0.0149 mol) of 1,6-hexanediamine, 15.6138 g (0.1344 mol) of 2-methyl-1,5-pentanediamine, and 30.1957 g (0.1493 mol) of dibutyl oxalate in the pre-polycondensation step to obtain a polyamide. The obtained polyamide was white tough polymer. The film molded from the polyamide was a colorless tough film.

Example 3

(i) Pre-polycondensation step: Inside of a separable flask having an inner volume of 5 liters, and equipped with a stirrer, an air-cooling tube, a nitrogen inlet tube and a starting materials-inlet port was replaced by a nitrogen gas with a purity of 99.9999%, and 1211 g (5.9876 mol) of dibutyl oxalate was charged therein.

This vessel was maintained to 20° C., and while stirring, 121.1 g (0.5988 mol) of 1,6-hexanediamine, and 626.2 g (5.3888 mol) of 2-methyl-1,5-pentanediamine were added to the mixture to carry out polycondensation reaction Incidentally, all the operations from charging the starting materials to the completion of the reaction were carried out under nitrogen stream with 200 ml/min (ii) Post-polycondensation step: The pre-polymerization product obtained by the above-mentioned operation was charged in a 5 L pressure vessel equipped with a stirrer, a thermometer, a torque meter, a pressure gauge, a nitrogen gas-inlet and a polymer-taken out port, and after repeating the operation five times that inside of the pressure vessel was maintained at a pressure of 3.0 MPa or higher, and then, a nitrogen gas was discharged to the normal pressure, and the temperature of the system was raised under nitrogen stream and normal pressure. Inside temperature was made 120° C. over 1.5 hours.

At this time, distillation of butanol was confirmed. The temperature of the mixture was raised to 260° C. over 5 hours while distillating butanol, and the mixture was reacted for 2 hours. Thereafter, the temperature of the inside of the system was lowered to 250° C., stirring was stopped and the reaction mixture was allowed to stand for 25 minutes. Then, inside of the system was pressurized by nitrogen to 3.5 MPa, and the polymerized product was taken out from the bottom portion of the pressure vessel in a string shape.

The string shaped polymerized product was immediately cooled with water, and the water-cooled string shaped polymerized product was pelletized by a pelletizer. The obtained polymerized product was a colorless tough polymer.

Example 4

The reaction was carried out in the same manner as in Example 1 except for using a separable flask having a volume of 500 mL, and charging
  200 ml of dehydrated toluene,
  3.0543 g (0.0263 mol) of 1,6-hexanediamine,
  7.1257 g (0.0613 mol) of 2-methyl-1,5-pentanediamine, and
  17.7173 g (0.0876 mol) of dibutyl oxalate in the pre-polycondensation step to obtain a polyamide.

The obtained polyamide was white tough polymer. The film molded from the polyamide was a colorless transparent tough film.

Example 5

The reaction was carried out in the same manner as in Example 1 except for using a separable flask having a volume of 500 mL, and charging
  200 ml of dehydrated toluene,
  5.3919 g (0.0464 mol) of 1,6-hexanediamine,
  5.3920 g (0.0464 mol) of 2-methyl-1,5-pentanediamine, and
  18.7694 g (0.0928 mol) of dibutyl oxalate in the pre-polycondensation step to obtain a polyamide. The obtained polyamide was white tough polymer.

The molded film from the polyamide was a white tough film.

Example 6

The reaction was carried out in the same manner as in Example 1 except for using a separable flask having a volume of 500 mL, and charging
  200 ml of dehydrated toluene,
  6.9441 g (0.0598 mol) of 1,6-hexanediamine,
  4.6294 g (0.0398 mol) of 2-methyl-1,5-pentanediamine, and
  20.1444 g (0.0996 mol) of dibutyl oxalate in the pre-polycondensation step to obtain a polyamide.

The obtained polyamide was white tough polymer.

The molded film from the polyamide was a white opaque tough film.

Example 7

The reaction was carried out in the same manner as in Example 1 except for using a separable flask having a volume of 500 mL, and charging
  200 ml of dehydrated toluene,
  7.9983 g (0.0688 mol) of 1,6-hexanediamine,
  3.4286 g (0.0295 mol) of 2-methyl-1,5-pentanediamine, and
  19.8889 g (0.0983 mol) of dibutyl oxalate in the pre-polycondensation step to obtain a polyamide.

The obtained polyamide was white tough polymer.

The molded film from the polyamide was a white opaque tough film.

Example 8

The reaction was carried out in the same manner as in Example 1 except for using a separable flask having a volume of 500 mL, and charging
  200 ml of dehydrated toluene,
  15.6138 g (0.1344 mol) of 1,6-hexanediamine,
  1.7349 g (0.0149 mol) of 2-methyl-1,5-pentanediamine, and
  30.1957 g (0.1493 mol) of dibutyl oxalate in the pre-polycondensation step to obtain a polyamide.

The obtained polyamide was white tough polymer.

The molded film from the polyamide was a white tough film.

Example 9

(i) Pre-polycondensation step: Inside of a separable flask having an inner volume of 5 liters, and equipped with a stirrer, an air-cooling tube, a nitrogen-inlet tube and a starting materials-inlet port was replaced by a nitrogen gas with a purity of 99.9999%, and 1211 g (5.9876 mol) of dibutyl oxalate was charged therein.

The vessel was maintained at 20° C., and 626.2 g (5.3888 mol) of 1,6-hexanediamine and 121.1 g (0.5988 mol) of 2-methyl-1,5-pentanediamine were charged under stirring to carry out polycondensation reaction.

Incidentally, all the operations from charging the starting materials to completion of the reaction were carried out under nitrogen stream with 200 ml/min.

(ii) Post-polycondensation step: The pre-polymerization product obtained by the above-mentioned operations was charged in a 5L pressure vessel equipped with a stirrer, a thermometer, a torque meter, a pressure gauge, a nitrogen gas-inlet port and a polymer-taken out port, and after repeating the operation five times that inside of the pressure vessel was maintained at a pressure of 3.0 MPa or higher, and then, a nitrogen gas was discharged to the normal pressure, and the temperature of the system was raised under nitrogen stream and normal pressure.

Inside temperature was made 120° C. over 1.5 hours.

At this time, distillation of butanol was confirmed.

The temperature of the mixture was raised to 340° C. over 5 hours while distillating butanol, and the mixture was reacted for 2 hours. Thereafter, the temperature of the inside of the system was lowered to 330° C., stirring was stopped and the reaction mixture was allowed to stand for 25 minutes. Then, inside of the system was pressurized by nitrogen to 3.5 MPa, and the polymerized product was taken out from the bottom portion of the pressure vessel in a string shape.

The string shaped polymerized product was immediately cooled with water, and the water-cooled string shaped polymerized product was pelletized by a pelletizer. The obtained polymerized product was a white tough polymer.

Example 10

(i) Pre-polycondensation step: Inside of a separable flask having an inner volume of 1 liter, and equipped with a stirrer, an air-cooling tube, a nitrogen inlet tube and a starting materials-inlet port was replaced by a nitrogen gas with a purity of 99.9999%, and 500 ml of dehydrated toluene, 56.9544 g (0.4901 mol) of 1,6-hexanediamine, and 1.7615 g (0.0152 mol) of 2-methyl-1,5-pentanediamine were charged therein.

The separable flask was placed in an oil bath, and the temperature thereof was raised to 50° C., 102.1956 g (0.5053 mol) of dibutyl oxalate was charged therein.

Next, the temperature of the oil bath was raised to 130° C., and the reaction was carried out under reflux for 5 hours. Incidentally, all the operations from charging the starting materials to completion of the reaction were carried out under nitrogen stream with 50 ml/min.

(ii) Post-polycondensation step: The pre-polymerization product obtained by the above-mentioned operations was charged in a reaction tube made of a glass having a diameter of about 35 mmφ, and equipped with a stirrer, an air-cooling tube and a nitrogen-inlet tube, and after repeating the operation five times that inside of the reaction tube was maintained at a reduced pressure of 13.3 Pa or lower, and then, a nitrogen gas was introduced to the normal pressure. Then, the tube was transferred into a salt bath maintained at 210° C. under nitrogen stream of 50 ml/min and heating was immediately started.

The temperature of the salt bath was raised to 340° C. over 1 hour, and inside of the vessel was reduced to about 66.5 Pa, and the product was reacted for further 2 hours.

Subsequently, a nitrogen gas was introduced until normal pressure, the product was then taken out from the salt bath and cooled to room temperature under a nitrogen stream of 50 ml/min to obtain a polyamide resin. The obtained polyamide was white tough polymer.

Comparative Example 1

The reaction was carried out in the same manner as in Example 1 except for using a separable flask having a volume of 300 mL, and charging 100 ml of dehydrated toluene, 15.5708 g (0.1340 mol) of 2-methyl-1,5-pentanediamine, and 27.0852 g (0.1339 mol) of dibutyl oxalate in the pre-polycondensation step, and the polymerization was carried out at a normal pressure in the post-polycondensation step to obtain a polyamide.

The obtained polyamide was a white polymer.

Comparative Example 2

The reaction was carried out in the same manner as in Example 1 except for using a separable flask having a volume of 300 mL, and charging 100 ml of dehydrated toluene, 15.5708 g (0.1340 mol) of 1,6-hexanediamine, and 27.0852 g (0.1339 mol) of dibutyl oxalate in the pre-polycondensation step, and the polymerization was carried out at a normal pressure in the post-polycondensation step to obtain a polyamide.

The obtained polyamide was a yellow polymer.

Comparative Example 3

A film was molded by using Nylon 6 (available from UBE INDUSTRIES, LTD., UBE Nylon 1015B) in place of the polyamide resin obtained by the present invention.

The obtained film of Nylon 6 was a colorless transparent tough film. A saturated water absorption rate, chemical resistance, hydrolysis resistance and fuel barrier property of the film were evaluated.

Comparative Example 4

A film was molded by using Nylon 66 (available from UBE INDUSTRIES, LTD., UBE Nylon 2020B) in place of the polyamide resin obtained by the present invention.

The obtained film of Nylon 66 was a colorless transparent tough film.

A saturated water absorption rate, chemical resistance, hydrolysis resistance and fuel barrier property of the film were evaluated.

A diamine composition, relative viscosity ηr, melt viscosity, melting point Tm, crystallization temperature Tc, 1% weight decrease temperature Td, temperature difference (Td−Tm), temperature difference (Tm−Tc), saturated water absorption rate, chemical resistance, hydrolysis resistance and fuel barrier property of the polyamides obtained in Examples 1 to 10 and Comparative examples 1 to 4 are shown in Table 1.

TABLE 1

|  |  | Comparative example 1 | Example 1 | Example 2 | Example 3 | Example 4 | Example 5 | Example 6 | Example 7 |
|---|---|---|---|---|---|---|---|---|---|
| Diamine composition (1,6-hexanediamine/2-methyl-1,5-pentanediamine) |  | 0/100 | 3/97 | 10/90 | 10/90 | 30/70 | 50/50 | 60/40 | 70/30 |
| Relative viscosity ηr | *1 | 2.51 | 2.55 | 2.58 | 2.65 | 2.61 | 2.15 | 2.06 | 1.95 |
| Number average molecular weight Mn | *2 | 21800 | 22400 | 22900 | 23900 | 23300 | 16500 | 15200 | 13600 |
| Melt viscosity (Pa · s) | *3 | 438 | 483 | 514 | 585 | 567 | 225 | 196 | 167 |
| Melting point Tm (° C.) | *4 | 199 | 200 | 200 | 200 | 201 | 264 | 275 | 292 |
| Crystallization temperature Tc (° C.) | *4 | 153 | 154 | 160 | 160 | 167 | 231 | 245 | 262 |
| Crystallization initiating temperature Ts (° C.) | *4 | 161 | 165 | 169 | 169 | 176 | 235 | 252 | 267 |
| 1% weight decrease temperature Td (° C.) | *5 | 330 | 333 | 335 | 335 | 340 | 359 | 362 | 364 |
| Td − Tm (° C.) |  | 131 | 133 | 135 | 135 | 139 | 95 | 87 | 72 |
| Tm − Tc (° C.) |  | 46 | 46 | 40 | 40 | 34 | 33 | 30 | 30 |

TABLE 1-continued

| | | Ex. 1 | Ex. 2 | Ex. 3 | Ex. 4 | Ex. 5 | Ex. 6 | Ex. 7 | Comparative example 1 |
|---|---|---|---|---|---|---|---|---|---|
| Saturated water absorption rate (%) | | 2.1 | 2.1 | 2.1 | 2.1 | 2.1 | 2.4 | 2.4 | 2.4 |
| Chemical resistance (weight residual rate) | Conc. Hydrochloric acid | Recover impossible | Recover impossible | Recover impossible | | Recover impossible | 101 | 101 | |
| | 64% sulfuric acid | Recover impossible | Recover impossible | Recover impossible | | Recover impossible | 103 | 103 | |
| | 30% NaOH | 103 | 103 | 102 | | 102 | 100 | 100 | |
| | 5% $K_2MnO_4$ | Recover impossible | Recover impossible | Recover impossible | | Recover impossible | 101 | 101 | |
| | Benzyl alcohol (50° C.) | 120 deformed | 120 deformed | 114 deformed | | 110 deformed | 104 | 104 | |
| Hydrolysis resistance | Water (pH 7) | 99 | 99 | 99 | | 99 | 100 | 100 | |
| | 0.5 mol/l sulfuric acid (pH 1) | 98 | 98 | 98 | | 99 | 100 | 100 | |
| | 1 mol/l NaOH (pH 14) | 98 | 98 | 98 | | 99 | 100 | 100 | |
| Fuel barrier property | Fuel transmission coefficient (g · mm/m2 · day) | 3.6 | 3.6 | 3.8 | 3.8 | 4.0 | 1.8 | 1.8 | 1.5 |

| | | | Example 8 | Example 9 | Example 10 | Comparative example 2 | Comparative example 3 | Comparative example 4 |
|---|---|---|---|---|---|---|---|---|
| | Diamine composition (1,6-hexanediamine/2-methyl-1,5-pentanediamine) | | 90/10 | 90/10 | 97/3 | 100/0 | Nylon 6 | Nylon 66 |
| | Relative viscosity ηr | *1 | 1.88 | 2.02 | 1.82 | 1.69 | | |
| | Number average molecular weight Mn | *2 | 12600 | 14600 | 12000 | 9800 | | |
| | Melt viscosity (Pa · s) | *3 | 133 | 185 | 103 | 94 | | |
| | Melting point Tm (° C.) | *4 | 318 | 318 | 326 | 331 | | |
| | Crystallization temperature Tc (° C.) | *4 | 294 | 293 | 303 | 309 | | |
| | Crystallization initiating temperature Ts (° C.) | *4 | 298 | 298 | 308 | 315 | | |
| | 1% weight decrease temperature Td (° C.) | *5 | 354 | 355 | 352 | 340 | | |
| | Td − Tm (° C.) | | 36 | 37 | 26 | 9 | | |
| | Tm − Tc (° C.) | | 24 | 25 | 23 | 22 | | |
| | Saturated water absorption rate (%) | | 2.3 | 2.3 | 2.3 | 2.4 | 10.4 | 5.6 |
| Chemical resistance (weight residual rate) | Conc. Hydrochloric acid | | 101 | 100 | 100 | | Recover impossible | Recover impossible |
| | 64% sulfuric acid | | 100 | 100 | 100 | | Recover impossible | Recover impossible |
| | 30% NaOH | | 100 | 100 | 100 | | | |
| | 5% $K_2MnO_4$ | | 100 | 100 | 100 | | Recover impossible | Recover impossible |
| | Benzyl alcohol (50° C.) | | 104 | 102 | 102 | | 133 deformed | 140 deformed |
| Hydrolysis resistance | Water (pH 7) | | 100 | 100 | 100 | | 96 | 97 |
| | 0.5 mol/l sulfuric acid (pH 1) | | 100 | 100 | 100 | | 96 (deteriorated) | 96 (deteriorated) |
| | 1 mol/l NaOH (pH 14) | | 100 | 100 | 100 | | 96 | 97 |
| Fuel barrier property | Fuel transmission coefficient (g · mm/m2 · day) | | 1.0 | 1.0 | 1.0 | 1.1 | 14.3 | 4.0 |

*1 Solvent: 96% sulfuric acid solution; concentration: 1.0 g/dl; temperature: 25° C.
*2 $^1$H-NMR measurement, solvent: deuterated sulfuric acid
*3 temperature: 280° C. (Examples 1 to 4 and Example 5), 340° C. (Examples 6 to 10); shear velocity: 0.1 sec$^{-1}$
*4 DSC measurement, nitrogen atmosphere; heating and cooling (scanning) rate: 10° C./min
*5 under nitrogen stream (20 ml/min) atmosphere, heating rate: 10° C./min The (first embodiment) polyamide resins of Examples 1 to 10 can sufficiently ensure all of a relative viscosity ηr (high degree of polymerization), a moldable temperature range estimated from a temperature difference (Td−Tm), heat resistance estimated from a melting point Tm, melt moldability estimated from a temperature difference (Tm−Tc), mold cyclic property estimated from a crystallization initiating temperature Ts, and low water absorbability as compared with the conventional polyoxamide resins (Comparative examples 1 and 2).

Further, (the second embodiment) polyamide resins obtained by Examples 1 to 4 can provide a polyamide resin having high melting points, larger difference between the melting point and the thermal decomposition temperature, excellent melt moldability, and ensuring low water absorbability appearing in an aliphatic linear polyoxamide resin more stably, among the first embodiment polyamide resins.

Further, (the third embodiment) polyamide resins obtained by Examples 6 to 10 each ensure all of the moldable temperature range, heat resistance, melt moldability and low water absorbability, and among the first embodiment resins, they are particularly excellent in chemical resistance, hydrolysis resistance and fuel barrier property.

From Table 1, the polyamide resin of the present invention is low water absorption as compared with the conventional aliphatic polyamide resin (Nylon 6 or 66), and excellent in chemical resistance, hydrolysis resistance and fuel barrier property.

Utilizability in Industry

The polyamide resin of the present invention is a polyoxamide resin excellent in low water absorbability, chemical resistance, hydrolysis resistance, fuel barrier property, etc., and excellent in melt moldability. It can be suitably used as a molding material for industrial materials, engineering materials, household commodities, etc. For example, it can be used wide uses such as automobile members, optical instrument members, electric·electronic equipments, information and communication-related equipments, precision instruments, civil engineering and construction instruments, medical supplies, household commodities, etc., as various kinds of injection molded products, sheets, films, pipes, tubes, monofilaments, fibers, etc.

The invention claimed is:

1. A polyamide resin which comprises
a polyamide resin comprising a dicarboxylic acid-derived unit and a diamine-derived unit being bonded,
the dicarboxylic acid contains oxalic acid, and
the diamine contains 1,6-hexanediamine and 2-methyl-1,5-pentanediamine,
wherein the temperature Td (° C.) is 331° C. or higher.

2. The polyamide resin according to claim 1, wherein the melting point Tm (° C.) is 200° C. or higher.

3. A polyamide resin which comprises
a polyamide resin comprising a dicarboxylic acid-derived unit and a diamine-derived unit being bonded,
the dicarboxylic acid contains oxalic acid, and
the diamine contains 1,6-hexanediamine and 2-methyl-1,5-pentanediamine,
wherein a molar ratio of the 1,6-hexanediamine to the 2-methyl-1,5-pentanediamine is 50:50 to 1:99, provided that 50:50 is excluded.

4. A polyamide resin which comprises
a polyamide resin comprising a dicarboxylic acid-derived unit and a diamine-derived unit being bonded,
the dicarboxylic acid contains oxalic acid, and
the diamine contains 1,6-hexanediamine and 2-methyl-1,5-pentanediamine,
wherein a molar ratio of the 1,6-hexanediamine to the 2-methyl-1,5-pentanediamine is 48:52 to 1:99.

5. The polyamide resin according to claim 3, wherein the temperature difference Td−Tm (° C.) is 96° C. or higher.

6. The polyamide resin according to claim 3, wherein the temperature difference Tm−Tc (° C.) is 34° C. or higher.

7. The polyamide resin according to claim 3, wherein a molar ratio of 1,6-hexanediamine to the 2-methyl-1,5-pentanediamine is 48:52 to 3:97.

8. A polyamide resin which comprises
a polyamide resin comprising a dicarboxylic acid-derived unit and a diamine-derived unit being bonded,
the dicarboxylic acid contains oxalic acid, and
the diamine contains 1,6-hexanediamine and 2-methyl-1,5-pentanediamine,
wherein a molar ratio of the 1,6-hexanediamine to the 2-methyl-1,5-pentanediamine is 99:1 to 50:50.

9. The polyamide resin according to claim 8, wherein a molar ratio of 1,6-hexanediamine to 2-methyl-1,5-pentanediamine is 99:1 to 60:40.

10. The polyamide resin according to claim 8, wherein the temperature Td (° C.) is 341° C. or higher.

11. The polyamide resin according to claim 8, wherein the melting point Tm (° C.) is 265° C. or higher.

12. The polyamide resin according to claim 8, wherein a molar ratio of 1,6-hexanediamine to 2-methyl-1,5-pentanediamine is 97:3 to 60:40.

* * * * *